(12) United States Patent
Yokoyama

(10) Patent No.: US 10,682,825 B2
(45) Date of Patent: Jun. 16, 2020

(54) PNEUMATIC TIRE AND METHOD OF MANUFACTURING THE PNEUMATIC TIRE

(71) Applicant: TOYO TIRE & RUBBER CO., LTD., Itami-shi, Hyogo (JP)

(72) Inventor: Toru Yokoyama, Itami (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 212 days.

(21) Appl. No.: 15/833,260

(22) Filed: Dec. 6, 2017

(65) Prior Publication Data

US 2018/0178470 A1 Jun. 28, 2018

(30) Foreign Application Priority Data

Dec. 27, 2016 (JP) .................................. 2016-253928

(51) Int. Cl.
*B29D 30/30* (2006.01)
*B29D 30/24* (2006.01)
(Continued)

(52) U.S. Cl.
CPC ..... *B29D 30/3021* (2013.01); *B29D 30/0601* (2013.01); *B29D 30/242* (2013.01); (Continued)

(58) Field of Classification Search
CPC .......... B60C 2009/2012; B60C 9/2204; B60C 2009/2219; B60C 2009/2041; (Continued)

(56) References Cited

U.S. PATENT DOCUMENTS 4,869,307 A * 9/1989 Bormann ............... B60C 9/2009
152/533
5,007,974 A * 4/1991 Maathuis ........... B29D 30/3028
152/533
(Continued)

FOREIGN PATENT DOCUMENTS

JP 2006-213278 A 8/2006
JP 2013-099905 A 5/2013

OTHER PUBLICATIONS

Gent, Alan Neville and Walter, Joseph D., "Pneumatic Tire" (2006). Department of Mechanical Engineering. Paper 854. http://ideaexchange.uakron.edu/nnechanical_ideas/854 (Year: 2006).*
(Continued)

*Primary Examiner* — Robert C Dye
*Assistant Examiner* — Alexander D Booth
(74) *Attorney, Agent, or Firm* — Westerman, Hattori, Daniels & Adrian, LLP

(57) ABSTRACT

A method of manufacturing a pneumatic tire includes forming a green tire. Forming the green tire includes: a first step of forming a first belt portion by winding a first belt on an outer peripheral surface of an inner liner and, thereafter, forming a second belt portion by winding a second belt on the first belt portion thus acquiring a belt layer; and a second step of acquiring a reinforcing layer by winding a reinforcing belt on the second belt portion. The second step includes: a first parallel winding treatment where the reinforcing belt is wound one turn on a first circumference; a spiral winding treatment where the reinforcing belt is spirally wound in a tire width direction; and a second parallel winding treatment where the reinforcing belt is wound on a second circumference within a range of from 240°±30° with one turn set to 360°.

3 Claims, 6 Drawing Sheets

(51) Int. Cl.
*B29D 30/06* (2006.01)
*B60C 9/22* (2006.01)
*B60C 11/04* (2006.01)

(52) U.S. Cl.
CPC .............. *B60C 9/22* (2013.01); *B60C 9/2204* (2013.01); *B60C 11/04* (2013.01); *B60C 2009/2219* (2013.01)

(58) Field of Classification Search
CPC .... B60C 2009/2035; B60C 2009/2038; B60C 2009/2204; B29D 30/3021; B29D 30/30; B29D 30/3028; B29D 30/3007
USPC ....................................................... 156/123
See application file for complete search history.

(56) References Cited

U.S. PATENT DOCUMENTS

| 5,223,061 A * | 6/1993 | Navaux ................. B60C 9/2009 152/527 |
| 2013/0048196 A1* | 2/2013 | Nobukuni .......... B29D 30/3021 156/117 |

OTHER PUBLICATIONS

Office Action dated Jul. 30, 2019, issued in Chinese Patent Application No. 201710991156.4, with English translation.

\* cited by examiner

PNEUMATIC TIRE AND METHOD OF MANUFACTURING THE PNEUMATIC TIRE

CROSS-REFERENCE TO RELATED APPLICATIONS

This application claims priority of Japanese Patent Application No.: 2016-253928 filed on Dec. 27, 2016, the content of which is incorporated herein by reference.

BACKGROUND OF THE INVENTION

Technical Field

The present invention relates to a pneumatic tire and a method of manufacturing the pneumatic tire.

Related Art

Conventionally, there has been known a pneumatic tire where a belt edge cover layer is formed by spirally winding a rubber strip material which is rewound from a winding apparatus (see JP-A-2006-213278).

However, in such a conventional pneumatic tire, in spirally winding the rubber strip material, the occurrence of irregularities in an overlapping state of the rubber strip material has not been taken into consideration at all. The irregularities in an overlapping state of the rubber strip material become a factor which brings about a variation in a force which acts in a rotary axis direction (lateral direction) of a tire. Such irregularities in an overlapping state of the rubber strip material also become one of causes which generate noises in a cabin.

SUMMARY

The present invention has been made by focusing on the occurrence of irregularities in an overlapping state of a reinforcing belt depending on the manner of winding of the reinforcing belt, and it is an object of the present invention to provide a pneumatic tire which can suppress a variation in a force which acts in a rotary axis direction (lateral direction) of a tire and a method of manufacturing the pneumatic tire.

According to one aspect of the present invention, there is provided a method of manufacturing a pneumatic tire which includes a step of forming a green tire, wherein the step of forming the green tire includes: a first step of forming a first belt portion by winding a first belt on an outer peripheral surface of an inner liner and, thereafter, forming a second belt portion by winding a second belt on the first belt portion thus acquiring a belt layer; and a second step of acquiring a reinforcing layer by winding a reinforcing belt on the second belt portion, and the second step includes: a first parallel winding treatment where the reinforcing belt is wound one turn on a first circumference; a spiral winding treatment where the reinforcing belt is spirally wound in a tire width direction; and a second parallel winding treatment where the reinforcing belt is wound on a second circumference within a range of from 240°±30° with one turn set to 360°.

With such steps, irregularities in an overlapping state of a wound reinforcing belt can be distributed in a well-balanced manner in the tire circumferential direction. As a result, a variation in a force in a rotary axis direction (lateral direction) (Lateral Force Variation: LFV) of a tire can be suppressed.

It is preferable that, in the second step, a parallel winding treatment be performed on the same circumference when the winding of the reinforcing belt is started, and the parallel winding treatment be performed at a position other than a tire outer diameter direction side in a region where the second belt portion is positioned.

With such a configuration, a space which the reinforcing layer occupies on a tire outer diameter side of the second belt is increased and hence, it is possible to prevent the occurrence of a drawback that the reinforcing layer is exposed on a surface of the tire.

It is preferable that a spiral winding direction of the reinforcing belt in the second step be set opposite to an angular direction of the second belt.

With such a configuration, it is possible to make the winding direction of the second belt and the winding direction of the reinforcing belt intersect with each other. Accordingly, the deformation of the second belt at the time of vulcanizing a green tire can be suppressed and hence, the tire can ensure favorable uniformity.

As a means for solving the above-mentioned problem, according to another aspect of the present invention, there is provided a pneumatic tire manufactured by vulcanizing a green tire, comprising: a belt layer on an outer peripheral surface of an inner liner, the belt layer including a belt layer where a first belt portion formed by winding a first belt, and a second belt portion formed by winding a second belt are sequentially formed; and a reinforcing layer formed by winding a reinforcing belt on the second belt portion and disposed at a position which corresponds to an edge region of the belt layer, wherein the reinforcing layer includes: a first parallel winding portion where the reinforcing belt is wound one turn on a first circumference; a spirally winding portion where the reinforcing belt is wound spirally in a tire width direction; and a second parallel winding portion where the reinforcing belt is wound on a second circumference such that the reinforcing belt is wound on the same circumference within a range of from 240°±30° with one turn set to 360°.

According to the present invention, irregularities in an overlapping state of the reinforcing belt in a tire circumferential direction is eliminated by devising a manner of winding the reinforcing belt and hence, it is possible to suppress a variation in a force which acts in a rotary axis direction (lateral direction) of a tire during traveling of a vehicle.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention is described with reference to attached drawings. The description made hereinafter is substantially provided for merely illustrating the present invention, and the description does not intend to limit the present invention, a product to which the present invention is applied or a usage where the present invention is used. Further, drawings are schematic drawings, and ratios between the respective sizes and the like may differ from corresponding actual ratios and the like.

Figure 1:
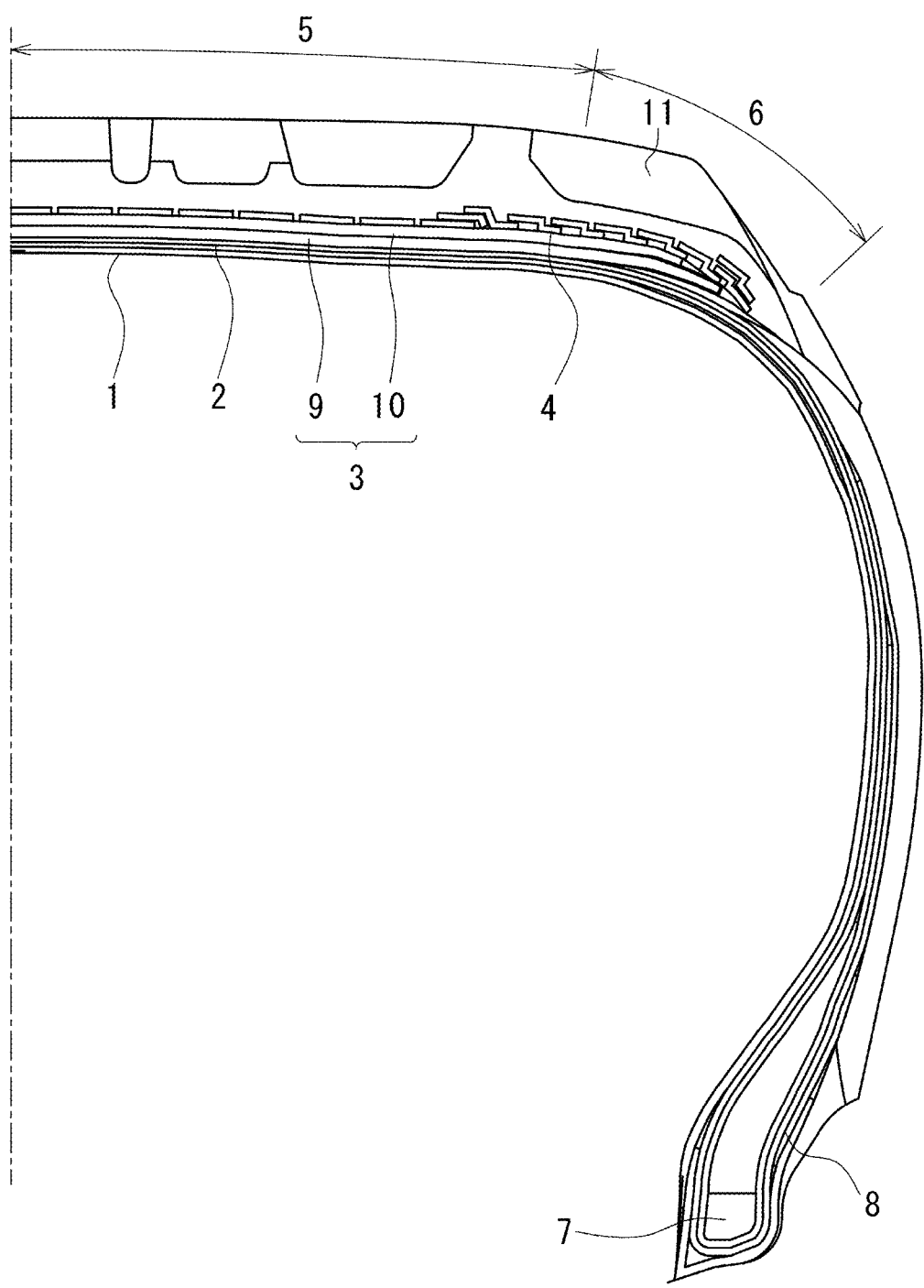
FIG. 1 is a meridian half sectional view schematically showing a pneumatic tire according to an embodiment.

FIG. 1 is a meridian half sectional view schematically showing a pneumatic tire according to this embodiment. The pneumatic tire includes, from an inner liner 1 positioned on an inner diameter side in the tire radial direction toward the tire outer diameter side, a carcass ply 2, a belt layer 3, and a reinforcing layer 4. A surface side of the pneumatic tire is formed of a tread portion 5 and a shoulder portion 6. Each of both edge portions of the carcass ply extends to a bead core 7 and is folded back from the inside toward the outside of the tire thus sandwiching a bead filler 8. The illustration and the description of other constitutional elements are omitted.

The belt layer 3 is formed of a first belt portion 9 disposed on the inside in the tire radial direction and a second belt portion 10 disposed on the outside in the tire radial direction. The first belt portion 9 extends to an intermediate portion of the shoulder portion 6 in the tire width direction. The shoulder portion 6 has shoulder lateral grooves 11 extending in the tire width direction. The second belt portion 10 has a narrower forming range toward the outside in the tire width direction than the first belt portion 9.

Figure 2:
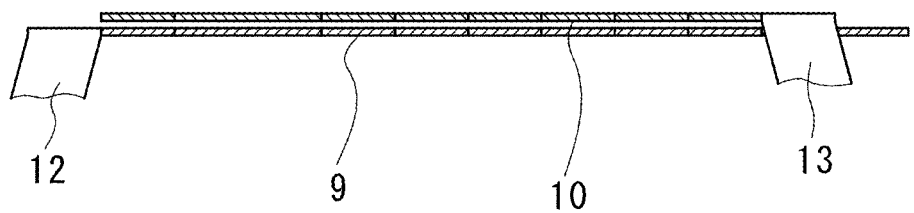
FIG. 2 is a cross-sectional view schematically showing a winding state of respective belts in belt layers shown in FIG. 1.
Figure 3:
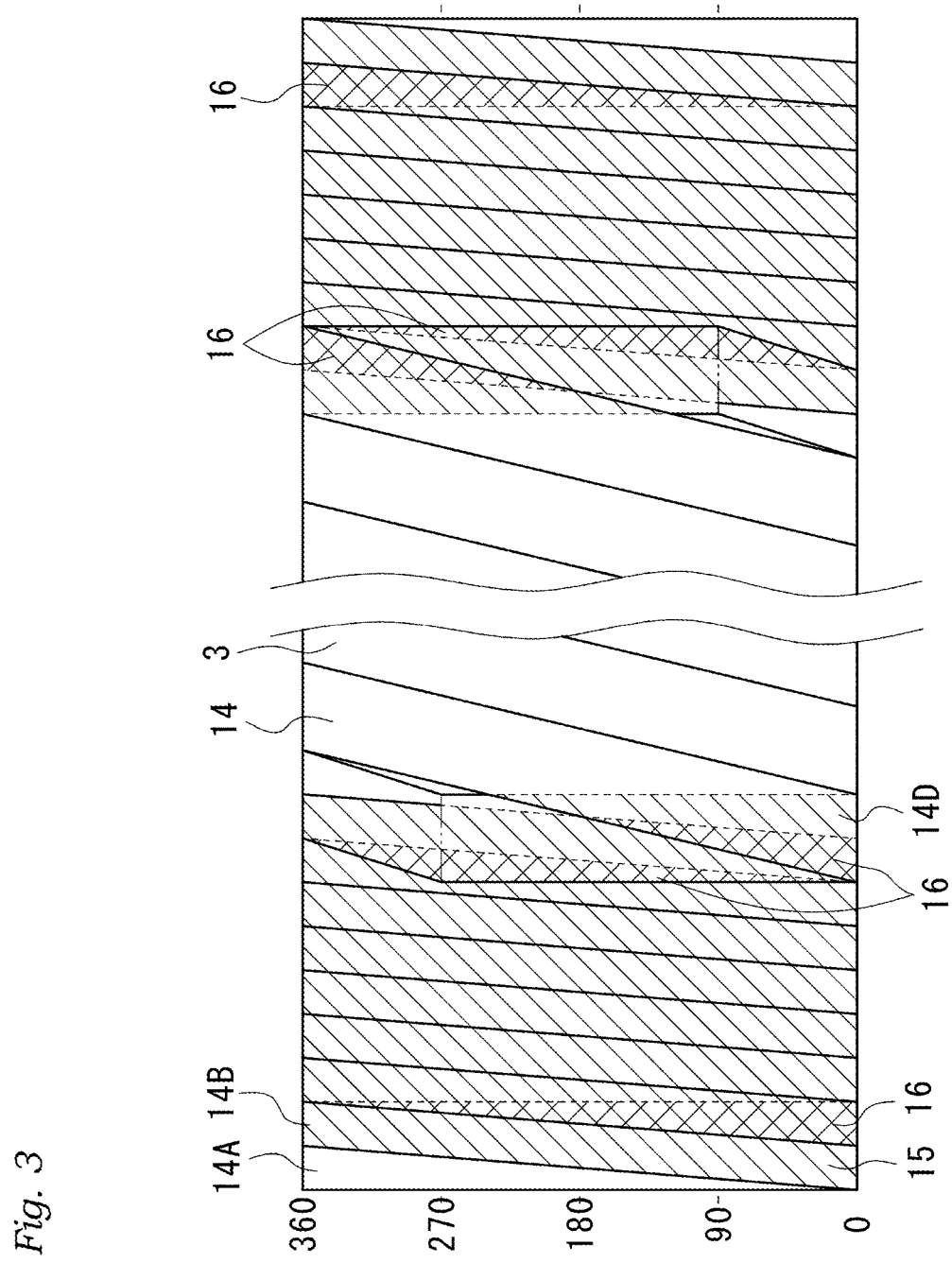
FIG. 3 is a developed view showing a winding state of a reinforcing belt shown in FIG. 1.

As shown in FIG. 2, the first belt portion 9 is acquired by a ribbon winding method where a first belt 12 is spirally wound, and the second belt portion 10 is acquired by a ribbon winding method where a second belt 13 is spirally wound. Each of the first belt 12 and the second belt 13 is a belt in which steel cords are arranged in a plurality of rows at predetermined intervals, and the steel cords are covered by a rubber material. A winding start position and a winding end position of the first belt 12 are disposed on a side opposite to a winding start position and a winding end position of the second belt 13 in the tire width direction so that the winding direction of the first belt 12 is opposite to the winding direction of the second belt 13. With such a configuration, the first belt 12 and the second belt 13 are wound such that the steel cords of the second belt 13 intersect with the steel cords of the first belt 12.

The reinforcing layer 4 is formed so as to cover the belt layer 3. The reinforcing layer 4 is acquired by a ribbon winding method where a reinforcing belt 14 is spirally wound. The reinforcing belt 14 is a belt in which fiber cords made of a resin material (for example, nylon 66) are arranged in a plurality of rows at predetermined intervals, and the fiber cords are covered by a rubber material.

Winding of the reinforcing belt 14 starts from a portion disposed on an outer side of one edge portion on one edge side of the belt layer 3, and ends at a portion disposed on an outer side of the other edge portion on the other edge side of the belt layer 3. In spirally winding the reinforcing belt 14, a winding start position and a winding end position of the reinforcing belt 14 are disposed on a side opposite to the winding start position and the winding end position of the second belt 13 in the tire width direction so that the winding direction of the reinforcing belt 14 is opposite to the winding direction of the second belt 13. With such a configuration, the reinforcing belt 14 is wound such that the fiber cords of the reinforcing belt 14 intersect with the steel cords of the second belt 13. Further, the reinforcing belt 14 is wound in parallel at the winding start position and the winding end position of the reinforcing belt 14. The reinforcing belt is wound in parallel also at a predetermined position disposed inside in the tire width direction from both edge portions of the belt layer 3 within a range described later. "The reinforcing belt 14 is wound in parallel" means that the reinforcing belt 14 is wound on the same circumference in the tire circumferential direction.

A pneumatic tire having the above-mentioned configuration is acquired in such a manner that a green tire is formed as described below, and the formed green tire is vulcanized.

In applying processing to a green tire, first, the inner liner 1 is wound around a drum not shown in the drawing, and the first belt 12 is wound around an outer peripheral surface of the inner liner 1 thus forming the first belt portion 9. Next, the second belt 13 is wound around the first belt 12 thus forming the second belt portion 10. In this manner, the belt layer 3 is acquired (first step).

In the first step, the first belt portion 9 is acquired by spirally winding the first belt 12 from one edge (first edge) to the other edge (second edge) in the tire width direction. The second belt portion 10 is acquired by spirally winding the second belt 13 from the second edge to the first edge in the tire width direction such that the inclination direction of the steel cords of the second belt 13 is opposite to the inclination direction of the steel cords of the first belt portion 9.

Subsequently, the reinforcing belt 14 is wound around an outer periphery of the belt layer 3 thus acquiring the reinforcing layer 4 (second step).

A method of winding the reinforcing belt 14 in the second step is described with reference to FIG. 3 to FIG. 7. In the drawing, the reinforcing belt 14 by an amount corresponding to one turn in the tire circumferential direction is taken on an axis of ordinates using 0 to 360°. A position on a tread surface in the tire width direction is taken on an axis of abscissas. In the drawing, a region where the reinforcing belt 14 is made to doubly overlap (double region 15) is indicated by hatching, and a region where the reinforcing belt 14 is made to triply overlap (triple region 16) is indicated by cross-hatching. In the drawing, the belt layer 3 is not described in an accurate manner, and only a portion of the belt layer 3 on which the reinforcing belt 14 is wound is described.

Figure 4:
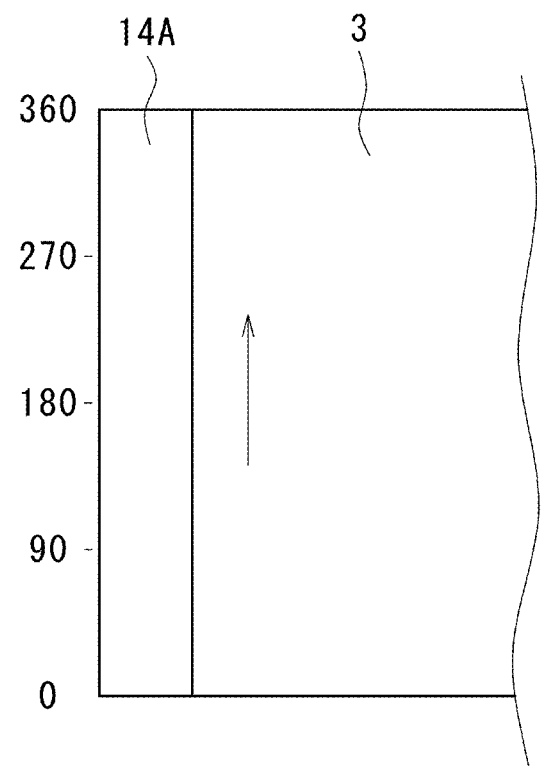
FIG. 4 is a partially developed view showing a state where the reinforcing belt shown in FIG. 2 is wound in parallel by an amount corresponding to a first one turn.

In the second step, as shown in FIG. 4, at the winding start position disposed on the one edge side outer than the belt layer 3 formed on the drum, a first parallel winding treatment is performed where the reinforcing belt 14 is wound in parallel by 360° (on a first circumference) thus forming a first parallel winding portion 14A. The first parallel winding portion 14A is disposed on a side opposite to the winding start position of the second belt 13. The first parallel winding portion is disposed at a position where the first parallel winding portion does not overlap with the belt layer 3. With such a configuration, there is no possibility that a thickness of the reinforcing layer 4 is increased more than necessary on the belt layer 3 so that a distance from the tread surface to the reinforcing layer 4 becomes short. Accordingly, it is possible to prevent the occurrence of a drawback that the reinforcing layer 4 is exposed on a bottom of a groove formed on a tread surface.

Figure 5:
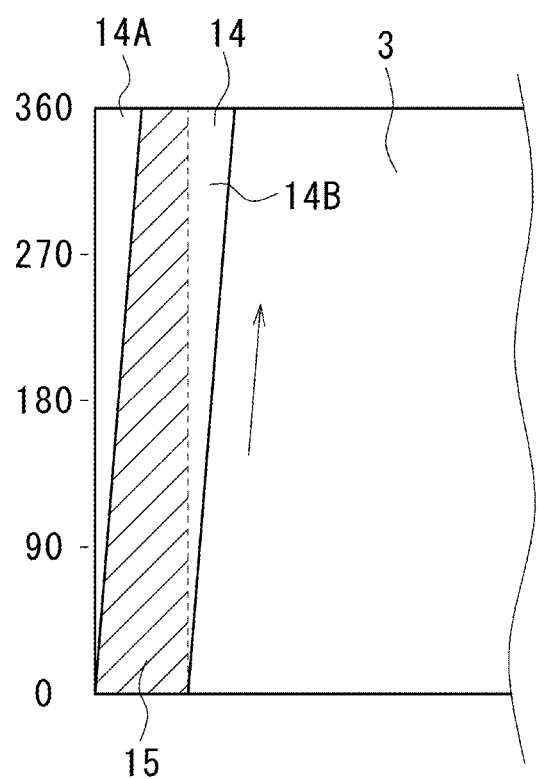
FIG. 5 is a partially developed view showing a state where the reinforcing belt is further spirally wound by an amount corresponding to one turn from a state shown in FIG. 3.
Figure 6:
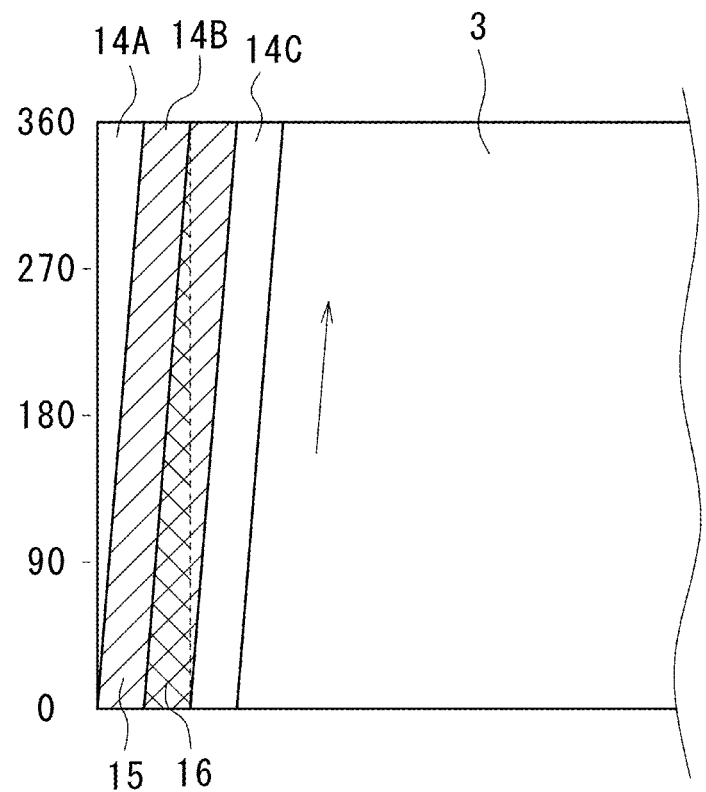
FIG. 6 is a partially developed view showing a state where the reinforcing belt forming a second turn is further spirally wound from a state shown in FIG. 4.

Subsequently, a spirally winding treatment is performed where the reinforcing belt 14 is spirally wound toward the other edge side thus forming a first spirally winding portion 14B. In this embodiment, a feed pitch is set to a half pitch until the reinforcing belt 14 is wound seven turns. As shown in FIG. 5, at the first parallel winding portion 14A which is the winding start position and the spirally winding portion 14B forming a first turn where the reinforcing belt 14 is fed at a half pitch, the double region 15 (indicated by hatching in FIG. 5) where the reinforcing belt 14 is made to doubly overlap is partially formed. As shown in FIG. 6, the first spirally winding portion 14B which is previously spirally wound and a second spirally winding portion 14C forming a second turn partially have the double region 15 and the triple region 16 (indicated by cross-hatching in FIG. 6) where the reinforcing belt 14 is made to triply overlap.

After the reinforcing belt 14 is spirally wound seven turns, a second parallel winding treatment is performed where the reinforcing belt 14 is wound in parallel thus forming a second parallel winding portion 14D. In this embodiment, the reinforcing belt 14 is wound in parallel (on a second circumference) from an end position of spiral winding to a position of 270° in the tire circumferential direction (indicated by a double-dashed line in FIG. 7). It is preferable that the reinforcing belt 14 be wound in parallel within a range of from 240°±30°.

Figure 7:
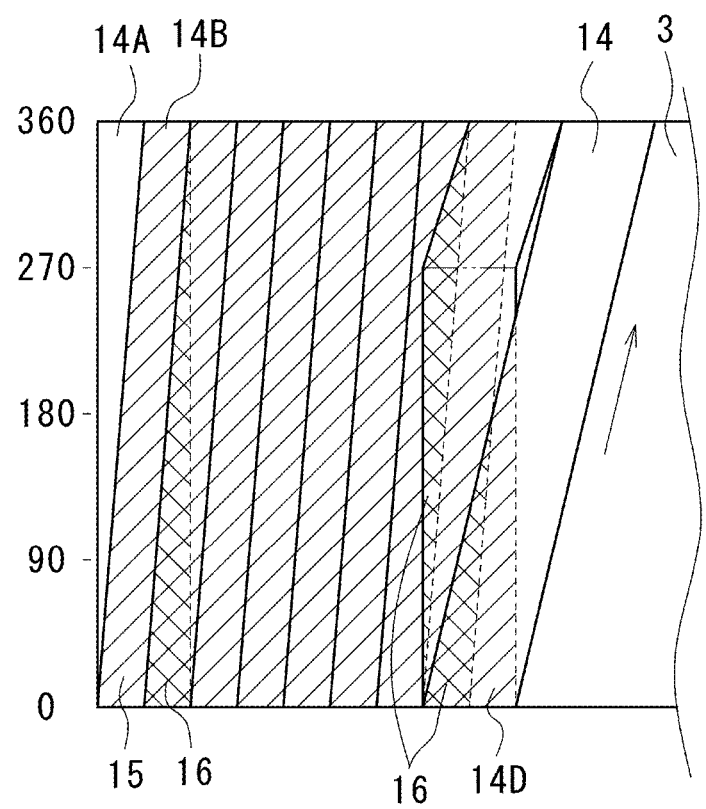
FIG. 7 is a partially developed view showing a state where the reinforcing belt is further spirally wound until the reinforcing belt forming a seventh turn is wound from a state shown in FIG. 5 and, thereafter, the reinforcing belt is wound in parallel and, then, the reinforcing belt is spirally wound by an amount corresponding to one turn at one pitch.
Figure 8:
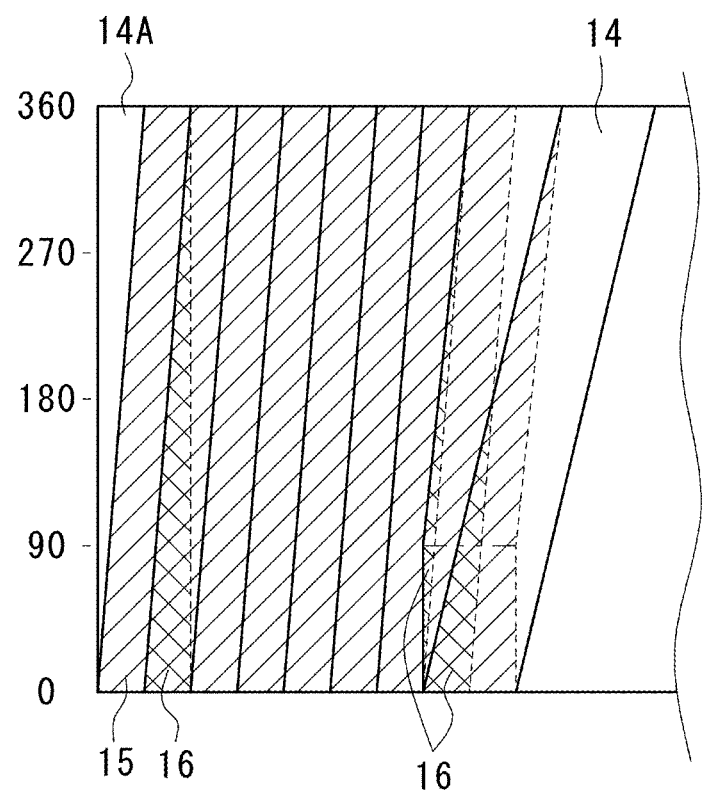
FIG. 8 is a developed view showing a winding state of a reinforcing belt according to a comparison example.

As described previously, FIG. 7 is a developed view showing a degree of overlapping of the reinforcing belt 14 when the reinforcing belt 14 is wound in parallel as described above from the end position of the spiral winding of the reinforcing belt 14 to a position of 270° in the tire circumferential direction. FIG. 8 is a developed view showing a degree of overlapping when the reinforcing belt 14 is wound in parallel to a position of 90° in the tire circumferential direction. As can be clearly understood by comparing FIG. 7 and FIG. 8 with each other, the tire shown in FIG. 7 and the tire shown in FIG. 8 largely differ from each other with respect to a degree of irregularities of the triple region 16 in the tire circumferential direction. The triple regions 16 are distributed in a well-balanced manner in the tire shown in FIG. 7 compared to the tire shown in FIG. 8.

Assume a range from 0° to 180° as "zone A", and a range from 180° to 360° as "zone B". In this case, the zone A and the zone B were compared with each other with respect to a rate (area (unit being cm2) in this embodiment) at which the triple region 16 occupies while changing the winding start position and the winding end position of the reinforcing belt in parallel winding by a unit of 30°. The comparison results are shown in Table 1.

TABLE 1

| Angle | 0 | 30 | 60 | 90 | 120 | 150 | 180 | 210 | 240 | 270 | 300 | 330 | 360 |
|---|---|---|---|---|---|---|---|---|---|---|---|---|---|
| Zone A | 27 | 27.5 | 29 | 32 | 34 | 35.5 | 36 | 37 | 40 | 45 | 51 | 57 | 63 |
| Zone B | 9 | 9 | 9 | 9 | 10 | 13 | 18 | 23.5 | 28 | 32 | 35 | 39.5 | 45 |
| A − B | 18.0 | 18.5 | 20.0 | 23.0 | 24.0 | 22.5 | 18.0 | 13.5 | 12.0 | 13.0 | 16.0 | 17.5 | 18.0 |

As can be clearly understood from Table 1, a difference between a triple region 16 in the zone A and a triple region 16 in the zone B was minimized when an angle falls within a range of from 240°±30°. That is, the pneumatic tire where the winding start position and the winding end position of the reinforcing belt falls within a range of from 240°±30° was well-balanced the most when the pneumatic tire was cut in plane symmetry with respect to a plane including a rotary axis. In performing a comparison, by dividing the pneumatic tire in the tire circumferential direction into four sections by a unit of 90°, into six sections by a unit of 60° or other sections instead of dividing the pneumatic tire into two sections, a balance of the pneumatic tire in the tire circumferential direction can be determined more appropriately.

Thereafter, on the tire outer peripheral side of the reinforcing layer 4, rubber layers forming the tread portion 5 and the shoulder portion 6 are formed by a ribbon winding method in the same manner thus acquiring a green tire. Then, the acquired green tire is vulcanized so that a pneumatic tire is completed.

The pneumatic tire which is completed as described above can acquire the following advantageous effects.

(1) The reinforcing belt is wound in parallel within a range of from 240°±30° in the course of winding the reinforcing belt so that the triple regions 16 can be distributed in a well-balanced manner in the tire circumferential direction. Accordingly, a weight balance is stabilized in the tire circumferential direction. Further, a variation in a force which acts in the tire width direction can be suppressed.

(2) The winding start position of the reinforcing belt 14 is set to a position other than the tire outer diameter direction side in the region where the second belt portion 10 is positioned. Accordingly, a thickness of the reinforcing layer 4 on the tire outer diameter side of the second belt portion 10 can be suppressed. Accordingly, even when a groove (shoulder lateral groove 11) is formed on the tread portion 5 at such a position, there is no possibility that the reinforcing layer 4 is exposed to the outside.

The present invention is not limited to the configuration described in the embodiment, and various modifications are conceivable.

In the embodiment, the reinforcing belt 14 is spirally wound three turns at the first edge region and the second edge region respectively. However, the number of times of winding is not limited to three, and the reinforcing belt 14 may be wound any number of times.

What is claimed is:

1. A method of manufacturing a pneumatic tire including a carcass ply, belt layer, and a reinforcing layer, comprising a step of forming a green tire, wherein
the step of forming the green tire comprises:
a first step of forming a first belt portion by winding a first belt on an outer peripheral surface of the carcass ply and, thereafter, forming a second belt portion by winding a second belt on the first belt portion thus acquiring the belt layer; and a second step of acquiring a reinforcing layer by winding a reinforcing belt on the second belt portion, and
the second step comprises in the recited order:
a first parallel winding treatment, as a beginning of the second step, where the reinforcing belt is wound one turn on a first circumference at a position which corresponds to an edge region of the belt layer, with one turn defined as being a complete 360° rotation of the reinforcing belt around the belt layer axis;
a first spiral winding treatment where the reinforcing belt is spirally wound in a tire width direction;
a second parallel winding treatment where the reinforcing belt is wound on a second circumference within a range of from 240°±30° with one turn set to 360°; and
a second spiral winding treatment where the reinforcing belt is wound in the tire width direction.

2. The method of manufacturing a pneumatic tire according to claim 1, wherein a spiral winding direction of the reinforcing belt in the second step is opposite to a winding direction of the second belt.

3. A pneumatic tire manufactured by vulcanizing a green tire, comprising:
a carcass ply;
a belt layer on an outer peripheral surface of the carcass ply, the belt layer including a first belt portion formed by winding a first belt, and a second belt portion formed on the first belt layer by winding a second belt; and
a reinforcing layer formed by winding a reinforcing belt on the second belt portion, wherein
the reinforcing layer includes:
a first parallel winding portion where the reinforcing belt is wound one turn on a first circumference at a position which corresponds to an edge region of the belt layer, with one turn defined as being a complete 360° rotation of the reinforcing belt around the belt layer axis;
a first spirally winding portion where the reinforcing belt is wound spirally in a tire width direction;
a second parallel winding portion where the reinforcing belt is wound on a second circumference such that the reinforcing belt is wound on the same circumference within a range of from 240°±30°;
a second spirally winding portion where the reinforcing belt is wound spirally in the tire width direction, and
the first parallel winding portion, the first spirally winding portion, and the second parallel winding portion, and the second spirally winding portion are arranged in the tire width direction in this order.

* * * * *